United States Patent Office 3,137,728
Patented June 16, 1964

3,137,728
PROCESS FOR PREPARING N-CHLOROIMINES
Stanley L. Reid, Dayton, Ohio, assignor to Monsanto
Company, St. Louis, Mo., a corporation of Delaware
No Drawing. Filed Aug. 14, 1959, Ser. No. 833,678
6 Claims. (Cl. 260—566)

This invention relates to N-substituted imines. In one aspect, this invention relates to N-chloroimines as new compounds. In another aspect, this invention relates to a method for preparing N-chloroimines from halogenated amines. Also, in another aspect, this invention relates to fungicidal compositions containing N-chloroimines. In still another aspect, this invention relates to methods for preventing the damping-off of plant seedlings by soil organisms by applying these new fungicidal compositions to the soil.

If is well known to dehydrohalogenate organic compounds having at least one halide atom and one hydrogen atom on each of adjacent carbon atoms by means of an alkali to split out hydrogen halide as a salt of the alkali and to form, as product of the process, a compound having an unsaturated linkage between said adjacent carbon atoms. Usually, the reaction is carried out by heating the organic compound with a strong alkali, such as sodium hydroxide or potassium hydroxide, in a solvent such as water, ethanol or polyhydric alcohol. Dehydrohalogenation reactions have been applied in making a wide variety of compounds, including ethylene from ethyl bromide, vinyl chloride from ethylene chloride, acetylene from vinyl bromide, proylene from propyl chloride or isopropyl chloride, 2-bromopropylene from acetone dibromide, cyclohexene from cyclohexyl chloride, and the like.

Imines, which have the characteristic structure

>C=N— are usually prepared by condensing an aldehyde or ketone with an amine. The unsaturated linkage between the adjacent carbon and nitrogen atoms of the imine has also been produced by catalytic dehydrogenation of an amine, at elevated temperature. Heretofore, attempts to make the N-substituted haloimines by dehydrohalogenation of the halogenated amine with alkali have generally been unsuccessful because of the formation of a variety of other products.

I have discovered that N-chloroimines can be readily formed by dehydrochlorinating an N-chlorinated amine using an alkaline reactant.

An object of this invention is to provide a dehydrochlorination process for forming an unsaturated linkage between an adjacent carbon atom and a chlorosubstituted nitrogen atom in organic compounds containing the same.

Another object of this invention is to provide a process for dehydrochlorinating chlorinated amines to form N-chloroimines in an improved manner.

Another object of this invention is to provide N-chloroimines as new compounds.

Another object of this invention is to provide fungicidal compositions containing N-chloroimines as the essential active ingredient.

Another object of this invention is to provide methods for preventing the damping-off of plant seedlings by soil organisms through application of the N-chloroimines to the soil.

Other aspects, objects and advantages of the invention are apparent from a consideration of the accompanying disclosure and the appended claims.

According to the present invention, a chlorinated organic reactant containing adjacent carbon and nitrogen atoms connected by a single bond and having a single hydrogen atom on the carbon atom, e.g., secondary carbon atom, and two chlorine atoms on the nitrogen atom are dehydrochlorinated with an alkaline reactant to split-out hydrogen chloride as a salt of the alkaline reactant and to form the chloroimine of the chlorinated organic reactant. The reaction can be illustrated by the following equation:

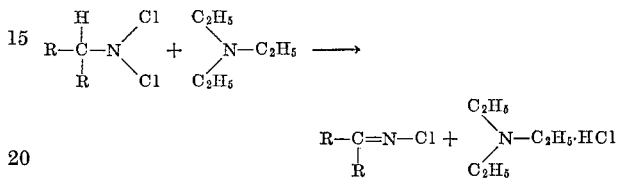

The chlorinated organic reactants can be generally represented as

wherein R' is a radical selected from the group consisting of sec-alkyl, cycloalkyl, sec-aralkyl, sec-(carboxyalkyl), and sec-(carboxyaralkyl) of from 3–20 carbon atoms. The dehydrochlorinated product of the reaction can be generally represented as $R_1$=N—Cl wherein $R_1$ is a radical selected from the group consisting of sec-alkylidene, cycloalkylidene, sec-aralkylidene, sec-(carboxyalkylidene), and sec-(carboxyaralkylidene) of from 3–20 carbon atoms.

Also, according to the present invention, there are provided, as new compounds, N-chloroimines of the formula $R_2$=N—Cl wherein $R_2$ is a radical selected from the group consisting of sec-alkylidene, sec-aralkylidene, sec-(carboxyalkylidene), and sec-(carboxyaralkylidene) of from 3–20 carbon atoms.

Further, according to the invention, there are provided fungicidal compositions comprising an inert carrier adjuvant and as the essential ingredient an N-chloroimine of the formula $R_1$=N—Cl wherein $R_1$ is as above defined.

Further, according to the invention, there is provided a method for preventing the damping-off of plant seedlings by soil organisms by application to the soil of a fungicidal quantity of an N-chloroimine of the formula $R_1$=N—Cl wherein $R_1$ is as above defined.

The chlorinated nitrogen reactant employed in conducting the reaction of this invention can be any nitrogen compound having a nitrogen atom attached to a secondary carbon atom by a single bond; that is, the nitrogen atom must be attached to a carbon atom having attached thereto only one hydrogen atom. Preferably, the chlorinated nitrogen reactant is an amine. Examples of organic radicals having a secondary carbon atom attached to a nitrogen atom include the sec-alkyl, cycloalkyl, sec-aralkyl, sec-(carboxyalkyl), and sec-(carboxyaralkyl) radicals. These radicals, which are represented in the structural formula set forth as R', preferably contain from 3 to 20 carbon atoms per molecule; however, these radicals of 3 to 20 carbon atoms are included only in a preferred form of the invention and R' radicals containing carbon atoms greater than 20 are operative in the invention since the reaction is dependent upon the structural relationship and not upon the number of carbon atoms in the radicals represented by R'.

By way of example, but not limitation, the following chlorinated nitrogen reactants can be subjected to the process of the invention, either alone, or in admixture with each other: N,N-dichloroisopropylamine, N,N-dichloro-sec-butylamine, N,N-dichloro-sec-amylamine, N,N-dichloro-sec-octylamine, N,N - dichloro - sec - decylamine, N,N-dichlorocyclohexylamine, N,N-dichlorocyclopentylamine, N,N-dichloro - 3,3,5 - trimethylcyclohexylamine, N,N-dichloro-α-cyclohexylethylamine, N,N-dichlorotetrahydro-α-naphthylamine, N,N-dichlorotetrahydro-β-naphthylamine, N,N-dichloro - α - phenylethylamine, N,N-dichloro - α - phenylpropylamine, α-N,N-dichloroaminopropionic acid, α-N,N-dichloroaminoisovaleric acid, α-N,N-dichloroaminoisocaprylic acid, α-N,N - dichloroamino-β-phenylpropionic acid.

The alkaline reactant employed in the process of this invention is preferably one which is only weakly basic as distinguished from strongly basic alkalis such as sodium hydroxide; however, strongly basic alkaline reactants can also be used under carefully controlled conditions. The preferred alkaline reactants include the tertiary amines, cyclic amines and alkali metal acetates, with less than 20 carbon atoms in the tertiary and cyclic amines. Although strongly basic alkaline reactants such as sodium hydroxide, potassium hydroxide, and calcium hydroxide can be used in the process of this invention, the rate of addition of the reactants and the temperature must be carefully controlled to avoid conversion of an N-chlorimine to undesired products.

As examples of preferred basic alkaline reactants which can be used may be mentioned trimethylamine, triethylamine, tripropylamine, tributylamine, potassium acetate, sodium acetate, and pyridine.

The products produced in the reaction of this invention comprise essentially the hydrogen chloride salts of the alkaline reactant and an imine which is substituted on the nitrogen atom with a chlorine atom. Thus, in the structural formula given above for the chlorinated nitrogen reactant, the sec-alkyl radicals give N-chloroalkylidenimines, the sec-aralkyl radicals give N-chloroaralkylidenimines, the cycloalkyl radicals give N-chlorocycloalkylidenimines, the sec-(carboxyalkyl) reactants give N-chlorocarboxyalkylidenimines and the sec-(carboxyaralkyl) reactants give N-chlorocarboxyaralkylidenimines.

In the process of this invention, the chlorinated nitrogen reactant and the alkaline reactant are usually brought together in a solvent media which is inert to each of the reactants. The solvent should be liquid at the reaction temperature and should preferably be one in which the hydrogen chloride salt of the alkaline reactant is insoluble. Examples of solvents which can be used include hexane, benzene, diethyl ether, ethanol, acetone, dioxane, and the like. The proper choice of solvent permits easier separation of the products of the reaction.

The reaction between the aforedescribed reactants is exothermic in character and proceeds without the application of external heat; however, heat is desirable in some instances to increase the speed of reaction. The reaction temperature will also be rather dependent upon the particular chlorinated nitrogen reactant subjected to the process; however, generally temperatures below 200° C. are used. Preferably, depending upon the particular solvent used, a temperature below 125° C. is employed. A temperature as low as 0° C. can be used; however, the rate of reaction is very slow at this temperature and usually the temperature is above 20° C.

The reaction of this invention is usually carried out at atmospheric pressure; however, superatmospheric pressure can be used, particularly if a solvent which is highly volatile at reaction temperature is employed.

The time required for the reaction will vary over a considerable range depending upon the type of reactants used and the particular temperature selected. At the lower temperatures, the reaction may take considerable time, e.g., from 20 to 48 hours. If higher temperatures are used, the reaction may generally be accomplished in a much shorter time, e.g., from 10 minutes to 20 hours.

Although stoichiometric amounts of the chlorinated nitrogen reactant and the alkaline reactant are usually used, a slight excess of either reactant can be employed without difficulty. However, the use of a large excess of the chlorinated nitrogen reactant leaves unreacted chlorinated nitrogen reactant in the product, thereby causing difficulty in separation from the N-chloroimine. A large excess of the alkaline reactant should not be used because at higher temperatures there may be reaction between the imine produced and the alkaline reactant to produce a wide variety of compounds.

After the reaction is complete, the N-chloroimine product is separated from the other components of the reaction mixture of which it forms a part by any convenient manner. For example, the imine product can be separated and recovered by filtration, distillation, and solvent extraction processes. By proper choice of solvent, the hydrogen chloride salt of the alkaline reactant can be made insoluble in the reaction mixture so that this salt can be separated by filtration and the imine product separated from the solvent by distillation. Where the hydrogen chloride salt is soluble in the solvent and the reaction mixture, the separation of the imine product can be effected by distillation. If a solvent which is soluble in water is used, the solvent can be removed from the reaction effluent by solvent extraction with water and the imine product recovered by distillation.

The process of the invention may be carried out in a batchwise, continuous or semi-continuous manner. For batch treatment, the chlorinated nitrogen reactant is usually added dropwise over a period of time to a solution of the alkaline reagent and solvent. In some cases inverse addition of the reactants may be desirable. The reaction is highly exothermic in character and usually proceeds without the application of external heat. However, it may be desirable to increase the speed of reaction by the more rapid addition of the chlorinated nitrogen reactant or by the application of external heat. If a continuous operation is desired, the two reactants can be brought together continuously and the reaction controlled by the circulation of a suitable heat transfer fluid through the reaction zone.

The novel N-chloroimines produced by the process of this invention are useful as intermediates in preparing amines, as copolymerizes for obtaining useful liquid or solid polymer products, as compounding agents for rubber, as antioxidants for various substances such as gasoline, as intermediates in the preparation of antihistaminic compounds, and as intermediates in other organic reactions as would be obvious to one skilled in the art. A particularly important field of use for the N-chloroimines of this invention is as soil fungicides in the prevention of damping-off of plant seedlings.

Many fungi living saprophytically in the upper layers of soil cause the damping-off of young seedlings. In pre-emergence damping-off, the sprouting seed rots before it breaks through the soil, and damping-off is recognized by bare spaces in what should be uniform rows. In post-emergence damping-off, the seedlings emerge from the soil but rotting and/or wilting occurs thereafter. The succulent stems have a water-soaked, thin necrotic and sunken zone at ground level, and the plants fall over on the ground, or, in woody seedings, wilt and remain upright with root decay soon following. Damping-off cannot be cured but it can be prevented by starting the seed in a sterile medium and by coating the seed with a protectant dust. Because most of the damping-off organisms are in the soil and not on the seed, the application of a fungicidal composition to the soil prior to planting of the seed is ordinarily very effective in killing or inhibiting the fungi in the soil and thereby preventing damping-off.

As noted above, the N-chloroimines have been found to be effective as soil fumigants in preventing the damping-off of plant seedlings. The N-chlorocycloalkylidenimines have been found to be particularly effective as soil fumigants; however, the N-chloro-sec-alkylidenimines and the N-chloro-sec-aralkylidenimines are also useful for this purpose.

The fungicidal compounds of this invention can be applied for the intended purpose in several ways as a solution, suspension, or dust wherein the active material comprises a small amount of the total composition applied to the soil. Where the fungicidal compounds are employed in a solution or an aqueous suspension, the composition may advantageously contain from 0.01 to 50% by weight of the active ingredient. When applied in the form of a dust, the concentration of the fungicidal compound may comprise from 1 to 20% by weight of the total composition.

Solvents or adjuvant carriers which are applicable in the present invention include those which have no definite effect upon the fungicidal activity of the N-chloroimines and which, when applied to the soil, are non-toxic to the plants. Among the carrier materials which are particularly suitable are petroleum, deodorized kerosene, isoparaffinic hydrocarbon fractions known as Soltrol and other liquid hydrocarbons. Preferably, the fungicidal compounds of this invention are applied as suspensions in water which can contain a suitable dispersing or surface active agent such as Triton X-100 (alkylated aryl polyether alcohol), Tween 20 (sorbitan monolaurate polyoxyethylene derivative).

Solid inert carriers which are suitable include talc, kieselguhr, chalk, fuller's earth, and the like. Also, if desired, the fungicidal compound can be admixed with either natural or synthetically prepared fertilizers for application to the soil.

The fungicidal compositions of this invention can be applied for their intended purpose in several ways. The composition containing the fungicidal compound may be applied to the surface of the soil and thereafter dragged or disced into the soil to the desired depth. Also, the fungicidal composition can be placed in a furrow beside a conventional plow share and thereafter covered by the succeeding furrow slice. In a preferred method for accomplishing the distribution of the fumigant in the soil, a liquid composition is distributed by spot injection or conventional drilling techniques wherein a measured quantity of the fungicidal composition is delivered into the soil at spaced intervals and at predetermined depths. Further, the distribution of the fungicidal composition may be accomplished by introducing a water dispersible or emulsifiable composition containing the fumigant material into the water employed to irrigate the soil.

Generally, it is advantageous to make application of the fumigant in a manner so as to deposit from 1 to 200 pounds of the active ingredient per acre of soil. However, larger or smaller amounts can be applied as desired, depending upon the nature of the soil, the kind of plant seedlings, and the types of fungi involved.

The advantages, desirability and usefulness of the present process in the preparation of the N-chloroimines, and compositions containing said imines, are well illustrated by the following examples.

Example 1

N-chlorocyclohexylidenimine was prepared by the dropwise addition of 7 g. of N,N-dichlorocyclohexylamine (0.041 mole) to a solution of 4.5 g. of triethylamine (0.045 mole) in 150 ml. of hexane. The reaction mixture was left standing for a few hours and then warmed gently on a steam bath for about 15 minutes. After the reaction mixture had been left standing overnight, the triethylamine-hydrogen chloride salt was removed by filtration. The hexane solvent was distilled from the filtrate at reduced pressure and the residue of the filtrate distilled to collect the N-chlorocyclohexylidenimine boiling at 64–66° C./2.5 mm. This fraction had a $n_D^{25}$ of 1.5052. The analysis of this material was as follows:

| Constituent | Found, Percent | Calculated for $C_6H_{10}ClN$, Percent |
|---|---|---|
| Carbon | 54.09 | 54.75 |
| Hydrogen | 7.45 | 7.66 |
| Chlorine | 26.42 | 26.94 |
| Nitrogen | 10.20 | 10.64 |

Example 2

N-chloroisopropylidenimine was prepared by the slow addition of 25.6 g. of N,N-dichloroisopropylamine (0.2 mole) to a solution of 20.2 g. of triethylamine (0.2 mole) in 400 ml. of anhydrous diethyl ether. The reaction mixture was left standing several hours and overnight at room temperature. The triethyl amine-hydrogen chloride salt was removed from the reaction mixture by filtration. The diethyl ether solvent was removed from the filtrate by distillation and the residue further distilled to obtain a fraction boiling at 45.7° C./70 mm. This fraction was redistilled twice to obtain the N-chloroisopropylidenimine boiling at 54.7° C./100 mm. having a $n_D^{25}$ of 1.4461. The infrared spectrum of this product checked with the structure proposed for N-chloroisopropylidenimine. The analysis of this product was as follows:

| Constituent | Found, Percent | Calculated for $C_3H_6ClN$, Percent |
|---|---|---|
| Carbon | 39.59 | 39.46 |
| Hydrogen | 6.82 | 6.61 |
| Chlorine | 38.40 | 38.74 |
| Nitrogen | 14.28 | 15.31 |

Example 3

N-chlorocyclohexylidenimine was prepared by the dropwise addition of 16.8 g. of N,N-dichlorocyclohexylamine (0.1 mole) over a period of 30 minutes to a solution of 25.0 g. of potassium acetate (0.25 mole) in 130 ml. of absolute ethanol at the reflux temperature. The reaction mixture was heated at the reflux temperature for 3½ hours and then cooled to room temperature. Ether (200 ml.) and benzene (100 ml.) were added to the cooled reaction mixture and the resulting solution washed three times with 100 ml. of water, followed by three washings with 50 ml. of 2 N hydrochloric acid and finally again with water. The solvent layer obtained was dried with calcium sulfate and the solvent removed at room temperature under vacuum. The residue consisted of 13 g. of an oil which was submitted to vacuum distillation through a column at 3 mm. pressure. After a small forerun, the product distilled at 53–54° C. giving a yield of 57%. For analysis, a sample was redistilled at a boiling point of 36° C./1.5 mm. This sample was found to have $n_D^{25}$ 1.5056. An analysis of this sample was as follows:

| Constituent | Found, Percent | Calculated for $C_6H_{10}ClN$, Percent |
|---|---|---|
| Carbon | 54.92 | 54.75 |
| Hydrogen | 7.82 | 7.66 |
| Chlorine | 26.63 | 26.94 |
| Nitrogen | 10.53 | 10.64 |

The infrared spectrum of this sample was entirely consistent with the formulation of the compound as N-chlorocyclohexylidenimine.

Example 4

In this example, the fungicidal properties of N-chlorocyclohexylidenimine were determined. Infested soil containing Pymatotrichum sp., *Rhizoctonia solani*, *Sclerotium rolfsii*, *Fusarium lycopersici*, *Verticillium alboatrum*, and Pythium sp., dumping-off fungi, was placed into a number of Mason jars to which were added various amounts of a 1% solution of the chloroimine to give known concentrations of the imine in the soil. The jar was sealed and the contents thoroughly mixed by vigorous shaking. The treated soil was incubated at room temperature and then transferred to 4-inch clay pots 24 hours later. Five seeds of each of Black Valentine beans, Delta Pine 15 cotton, Straight Eight cucumber, and Laxton's Progress peas were sown in each pot. The seeded pots were then incubated at 70° F. and 98% relative humidity to assume activity of the damping-off organisms in the soil. After the elapse of 24 hours, the pots were removed to the greenhouse where disease assessments were made from 10 to 14 days later. Of the 20 seeds planted, from 15 to 17 healthy plants were found in the pot containing soil which had been treated with the N-chlorocyclohexylidenimine in a concentration of 100 p.p.m. or approximately 200 pounds per 6-inch acre. At a concentration of 30 p.p.m., from 18 to 20 healthy plants out of a possible 20 were observed. Only one healthy plant out of 20 plants was found in the untreated controls.

Example 5

The fungicidal properties of N-chloroisopropylidenimine were determined by using the procedure described in Example 4. In these tests, 15 to 17 healthy plants out of a possible 20 were observed in pots containing soil treated at a rate of 100 p.p.m.

Example 6

N-chlorocyclohexylidenimine was prepared by the dropwise addition of 16.8 g. (0.1 mole) of N,N-dichlorocyclohexylamine to a continuously stirred solution of 5.6 g. (0.1 mole) of potassium hydroxide in 120 ml. of water to which was added 200 ml. of dioxane. The stirring was continued for an additional 15 minutes while maintaining the temperature below 35° C. Upon standing, the reaction mixture separated into two phases. The organic phase was separated and the aqueous phase was extracted twice with diethyl ether. The extracts and the organic phase were combined and dried over anhydrous calcium chloride. The solvent was removed by distillation at reduced pressure to obtain a fraction boiling at 35–40° C./1 mm. Redistillation of this fraction resulted in the recovery of 4 g. of N-chlorocyclohexylidenimine boiling at 33–35° C./1 mm. having a $n_D^{25}$ of 1.5053.

Reasonable variation and modification are possible within the scope of the foregoing disclosure and the appended claims, the essence of which is that there have been provided (1) methods for preparing N-chloroimines from halogenated amines, (2) N-chloroimines as new compositions, (3) fungicidal compositions containing said N-chloroimines as the essential active ingredient, (4) and methods for preventing the damping-off of plants by the application of said fungicidal compositions to the soil.

I claim:

1. The process for producing N-chloroimines which comprises reacting in an inert solvent medium an organic nitrogen compound of the formula

wherein R' is a radical selected from the group consisting of sec-alkyl, cycloalkyl, sec-aralkyl, sec-(carboxyalkyl), and sec-(carboxyaralkyl) of from 3 to 20 carbon atoms with about a stoichiometric amount of an alkaline reactant selected from the group consisting of tertiary amines and cyclic amines having less than 20 carbon atoms, and alkali metal acetates, at a temperature of from 0° C. to 200° C. to split-out hydrogen chloride and to form the N-chloroimine as product of the process.

2. The process according to claim 1, wherein R' is a cycloalkyl of from 3 to 20 carbon atoms, and the alkaline reactant is a tertiary amine having less than 20 carbon atoms.

3. The process according to claim 2 wherein the tertiary amine is triethylamine.

4. The process according to claim 1 wherein said solvent medium is selected from the group consisting of hexane, benzene, ethanol, ether, dioxane and acetone.

5. The process which comprises dehydrochlorinating N,N-dichlorocyclohexylamine with about a stoichiometric amount of triethylamine in a solvent of hexane at a temperature of from 0° C. to 200° C. and recovering N-chlorocyclohexylidenimine as product of the process.

6. The process which comprises dehydrochlorinating N,N-dichloroisopropylamine with about a stoichiometric amount of triethylamine in a solvent of diethyl ether at a temperature of from 0° C. to 200° C. and recovering N-chloroisopropylidenimine as product of the process.

References Cited in the file of this patent

UNITED STATES PATENTS

| | | |
|---|---|---|
| 2,894,028 | Rudner | July 7, 1959 |
| 2,898,265 | Wegler et al. | Aug. 4, 1959 |

OTHER REFERENCES

Cross et al.: J. Chem. Soc. (London), vol. 97, pp. 2404–2406 (1910).

Stieglitz et al.: Ber. Deut. Chem., vol. 43, pp. 782–787 (1919).

Houser: J.A.C.S., vol. 52, 1108 to 1111 (1930).

Theilacker et al.: Ann. der Chem., vol. 563, pp. 99–104 (1949).

Lindsay et al.: J. Chem. Soc. (London), vol. 1946, pp. 791–792.